United States Patent [19]

Nilsson et al.

[11] Patent Number: 4,704,243

[45] Date of Patent: Nov. 3, 1987

[54] METHOD FOR PRODUCING A THERMOPLASTIC CONTAINER HAVING A RING-SHAPED REINFORCING ZONE AT ITS BOTTOM

[75] Inventors: Torsten Nilsson, Löddeköpinge; Kjell M. Jakobsen, Skanör, both of Sweden

[73] Assignee: PLM AB, Malmo, Sweden

[21] Appl. No.: 708,779

[22] Filed: Mar. 6, 1985

Related U.S. Application Data

[62] Division of Ser. No. 443,938, Nov. 23, 1982, Pat. No. 4,512,735.

[30] Foreign Application Priority Data

Nov. 26, 1981 [SE] Sweden .................................. 8107044

[51] Int. Cl.[4] ...................... B29C 49/00; B29C 49/12; B29C 55/22; B29C 57/00
[52] U.S. Cl. .................................... 264/521; 264/532; 264/531; 264/533; 264/534; 264/292; 264/296
[58] Field of Search ............... 425/532, 526, 160, 143, 425/543, 383, 387.1, 390, 398, 522, 528, 533; 264/521, 531, 532, 533, 534, 292, 296

[56] References Cited

U.S. PATENT DOCUMENTS

| | | | |
|---|---|---|---|
| 3,733,309 | 5/1973 | Wyeth et al. ................... | 264/540 X |
| 3,981,668 | 9/1976 | Farrell ............................ | 425/389 X |
| 4,035,455 | 7/1977 | Rosenkranz et al. ........... | 264/534 X |
| 4,177,239 | 12/1979 | Gittner et al. .................. | 264/532 X |
| 4,412,966 | 11/1983 | Yoshino et al. ................. | 264/533 X |
| 4,467,929 | 8/1984 | Jakobsen et al. ................ | 264/530 |
| 4,496,517 | 1/1985 | Kinoshita et al. ............... | 264/521 |

Primary Examiner—Jan H. Silbaugh
Assistant Examiner—Neil M. McCarthy
Attorney, Agent, or Firm—Roberts, Spiecens & Cohen

[57] ABSTRACT

A container (30d) of polyethylene terephthalate or similar thermoplastic material has a container body (32d), a mouth portion (37d) and a central bottom part (34d). The central bottom part consists of chiefly amorphous and/or thermocrystallized material and forms a bulge directed towards the interior of the container. A ring-shaped or band-shaped standing surface (36d) is arranged adjacent the transition of the bottom part into the container wall (32d). Adjacent to the standing surface the container has a circumferential area of material (35d) which by stretching and/or reshaping has undergone flow and by heating has acquired built-in stresses which tend to contract it. The surrounding circumferential area of material prevents the inward bulge of the central bottom part from straightening out and/or turning inside out when the pressure in the container is increased and/or when the temperature of the container material is raised.

12 Claims, 14 Drawing Figures

METHOD FOR PRODUCING A THERMOPLASTIC CONTAINER HAVING A RING-SHAPED REINFORCING ZONE AT ITS BOTTOM

This is a divisional on application Ser. No. 443,938, filed Nov. 23, 1982, now U.S. Pat. No. 4,512,735.

FIELD OF THE INVENTION

The present invention relates to a method for producing a container of thermoplastic material, preferably of polyethylene terephthalate or similar material having a central bottom part of amorphous, oriented and/or thermocrystallized material which forms a bulge directed towards the interior of the container which merges into an area of material around the central bottom part. Said area of material has undergone material flow through stretching and/or reshaping and has been contracted and/or acquired built-in stresses through heating whereby said area of material prevents the inward bulge from straightening out or turning inside out when the pressure inside the container is increased and/or in connection with heating of the same.

PRIOR ART

In the field of packaging there exists a need for containers of thermoplastic material capable of resisting an internal pressure of at least about 7 kgf/cm$^2$ for the storage of carbonated beverages, e.g. beer or soft drinks. It has so far not been possible at reasonable cost to achieve can-shaped free-standing containers, for example, which under unfavorable conditions, e.g. at high temperature, are deformed by such a negligible degree that the deformation can be accepted in regard to shape change, volume change, standing stability, etc.

It is mainly the bottom of the container that gives rise to problems since on deformation of the bottom the standing stability of the container is reduced. There is also a risk of the bottom splitting or turning inside out. In order to meet the demand for resistance to internal pressure and for standing stability, the bottom of the container has, in accordance with known techniques, a mainly spherical shape and the container is fitted with a separate base which is glued, welded or clipped into position on the container. Such a construction is naturally expensive owing to the extra manufacturing operations that the production and assembly of two separate parts entail. The amount of material needed for the bottom part of the assembled container is also undesirably large.

Free-standing containers so far known having no separate base are too weak and attempts that have been made to use such containers for the purpose specified here have resulted in splitting of the containers due to the rise in pressure that occurs during filling and the handling of filled packagings.

An indispensable requirement for packagings is that their costs can be accepted in regard to the end-price of the product in the consumer market. The packaging costs also weigh heavily because the packagings are manufactured and used in large series. In accordance with known techniques it has so far been possible, by using a large quantity of material in each packaging, to achieve a free-standing package of thermoplastic material with the ability to meet the previously specified requirements, but the amount of material used has been so great that the costs have become far too high to enable such packagings to be accepted.

In accordance with known techniques it is possible to produce bottles with a mouth portion of monoaxially oriented material usually with a cylindrical container body of biaxially oriented material and with a central bottom part of amorphous or thermal crystallized material. Such containers have a body in which biaxial stretching of the material is obtained through a process in which the degree of stretching of the material in the axial direction of the container body and in the circumferential direction of the container body is mainly determined by the ability of the material itself to elongate when the preform is subjected to internal pressure in conjunction with being blown into the shape of the container. As a rule, insufficient stretching of the material along the axis of the container is obtained although in certain applications attempts have been made to improve this stretching by means of a mechanical device in the form of a mandrel which extends the preform along its axis in the initial stage of blowing it into the shape of the container. Examples of this techniques will be found in GB No. 1 536 194 and GB No. 2 052 367. The known technique described is solely related to the production of bottles and not to the production of containers in the nature of cans.

It is known that polyethylene terephthalate, henceforth abbreviated to PET, which is stretched monoaxially and particularly biaxially about three times in the direction of each axis acquires extremely good material properties, see U.S. Pat. No. 4 152 667, for example. An extremely sure and effective technical method of achieving such stretching is to stretch the material until it undergoes flow: Examples of techniques where such stretching occurs are given in GB No. 2 052 365 and GB No. 2 052 367.

PET which is stretched so that it undergoes flow has, as stated above, extremely high tensile strength combined with little elongation. In connection with reshaping preforms containing such material it is therefore not possible to stretch the material further in the earlier stretching direction in order to obtain the desired shape of the container.

Further, on heating PET which has been stretched and thereby oriented, the material shrinks in the stretching direction. Shrinking occurs both when stretching has been carried so far that flow has occurred in the material and also in the case of lesser stretching conditions and regardless of whether stretching is monoaxial or multiaxial, e.g. biaxial. These properties accentuate the problems associated with reshaping a preform into a container.

The physical properties mentioned above do not apply solely to PET but to a greater or lesser degree also to many other thermoplastic materials. Examples of such materials are polyhexamethylene-adipamide, polycaprolactum, polyhexamethylene-sebacamide, polyethylene-2,6-naphthalate and polyethylene-1.5-naphthalate, polytetramethylene-1.2-dioxybenzoate and copolymers of ethylene terephthalate, ethylene isophthalate and other similar polymer plastics.

SUMMARY OF THE INVENTION

An object of the present invention is to provide a method for producing a container of can-shape.

The container has a central bottom part which consists chiefly of amorphous, oriented and/or thermocrystallized material, the said central bottom part being surrounded by a ring-shaped area of oriented material. The central bottom part is displaced inwards towards the center of the container and as a result a ring-shaped standing surface is created adjacent to and principally outside the central bottom part. The ring-shaped area of mateial is formed through stretching to flow of mainly amorphous material which, as in a tubular blank, is situated adjacent the bottom closure of the blank and which before stretching is a ring-shaped and mainly amorphous part of material in the blank. In certain applications the ring-shaped part of material in the blank is at least partially situated at a shorter distance from the axis of the blank than the material forming the mainly cylindrical walls of the blank. Through stretching to flow, the material in the ring-shaped section is oriented chiefly along the axis of the container, to which is added a certain preferably lesser orientation in the circumferential direction of the material. The ring-shaped area of material accordingly forms in the container a transition between the material in the container body and the central bottom part of the container.

The material stretched to flow in the ring-shaped area has undergone a certain degree of shrinking by the material being heated to a temperature higher than TG. However, the central bottom part situated inside the ring-shaped area of material prevents complete shrinkage corresponding to the raised temperature of the material whereby forces are built into the ring-shaped material which act to contract (shrink) the material still further. As a result, the ring-shaped area of material has an extremely small tendency to elongate and prevents the inward bulge of the central bottom part from straightening out and/or turning inside out as a result of raised internal pressure in the container and/or raised temperature of the container material.

The material in the ring-shaped area has in the case of PET a maximum crystallization of approximately 17% which has arisen in connection with stretching of the material to flow, to which is added thermal crystallization which has been formed in connection with heat treatment of the material and which amounts to a maximum of about 15% and is preferably less than 10%.

In a preferred version of the invention, all material in the cylindrical portion of the blank is stretched to flow, whereby the parts of material which are situated nearest the bottom closure of the stretched blank correspond to the ring-shaped area of material. In a container which has been shaped from such a blank, the container body and mouth portion of the material consist of material oriented along the axis of the container with an orientation corresponding to the orientation the material is given in connection with monoaxial stretching to flow. In addition to orientation along the axis of the container, the material also has a certain preferably lesser orientation in the circumferential direction of the container as well as certain preferably lesser thermal crystallization.

In an initial application of the preferred version, the container has the shape of a straight cylinder whose walls consist of material oriented along the axis .

In a second application the walls of the container, in addition to the axial orientation, have an orientation in the circumferential direction of the container.

In a third application, the central bottom part contains parts of material, the original thickness of which has been reduced through compression to an extent which gives the material improved properties corresponding to the material properties obtained in connection with stretching the material to flow. In the case of PET, for example, such improved properties begin to appear at approximately two-fold compression. In accordance with the invention it is possible to shape these reinforced parts of material in the form, for example, of squares, concentric rings, ribs directed towards the walls of the container body, and as combinations of these.

In one version of the invention the container is stable in shape up to a certain raised temperature. This has been achieved through heating of the material at least to the said temperature. Also a certain degree of thermal crystallization arises in the material in addition to the crystallization arising through orientation.

In certain versions the material in the central bottom part has a raised thermal crystallization compared with the other material of the container.

In other versions the central bottom part is arranged with thicker reinforced sections of material which form a pattern of squares, concentric rings, radial ribs, etc. The reinforced sections of material preferably have a raised thermal crystallization.

In the case of PET and with the material stretched to flow, the material in the container body and in the mouth portion has a crystallization in the 15–33% range, preferably in the 15–25% range. Crystallization consists partly of the crystallization arising in connection with orientation of the material and partly of thermal-conditioned crystallization. The crystallization arising through orientation amounts in the case of biaxial orientation to a theoretical maximum of about 33% but in the majority of applications orientation conditions are used which limit the crystallization achieved through orientation to about 25%.

In the above-mentioned initial application of the invention the crystallization arising through orientation is limited to a maximum of about 17% to which is added, where applicable, thermal crystallization amounting to a maximum of about 15% and preferably less than 10%.

In the second application the crystallization arising through orientation may reach the stated theoretical maximum of about 33% but in most applications has a value in the 15–25% range to which is added, where applicable, thermal crystallization amounting to a maximum of 15% and preferably less than 10%.

Depending on which alternative version of the bottom part is chosen, crystallization in the material of the bottom part varies from a few per cent up to about 25–30%, where the thermal-conditioned crystallization is usually less than 10–15%.

The crystallization values given in this patent application are based on the theory advanced in the publication "Die Makromolekulare Chemie" 176, 2459–2465 (1975). The values refer to the material PET. In applications of the invention using other materials, crystallization values characteristic of these materials will of course be obtained.

For the production of a container in accordance with the invention a tubular blank of mainly amorphous material is used. The tube is closed at one end. The material in the walls of the tube are stretched to flow at least in a ring-shaped area of material adjacent the bottom closure of the blank.

In a preferred version of the invention the material is stretched by passing the whole blank through a draw ring at the same time as a mandrel occupies the interior of the blank. In this way the blank is elongated by an amount corresponding to the reduction in the thickness of the walls of the blank. In the case of PET the elongation is about three times. During the passage of the blank through the draw ring, at the transition between the material that has already passed through the draw ring and the material that is just about to pass through it, a transitional zone is formed between material stretched along the axis of the blank, i.e. oriented material, and material which has not yet been stretched, i.e. chiefly amorphous material. Heat is released in connection with the molecular restructuring, which takes place during the passage of the material through the draw ring. Both the internal mandrel and the draw ring are maintained at a temperature in the vicinity of or in the range of the glass transition temperature of the material, henceforth designated TG. As a rule, passages for this purpose are arranged in both the mandrel and the draw ring to carry liquid for regulating the temperature of the mandrel and draw ring respectively. In the event of excessively high temperature in the material at the transitional zone, contact between the material and the draw ring is lost in parts of the transitional zone, which leads to unwanted effects in the material that is to pass through, or has passed through, the draw ring. In conjuntion with its passage through the draw ring the material is temporarily allowed to assume a temperature somewhat in excess of TG. In the case of PET, temperture in excess of 105° C. are as a rule unsuitable. Described in patent application DEOS No. 31 21 524.6 is a version of material stretching using draw rings as described in brief above.

Preferably in connection with the recently described stretching of the material in the walls of the blank, the bottom closure is given a shape largely coinciding with the final shape of the central bottom part of the container that is to be shaped. Shaping of the bottom part takes place by means of a die and a stamp or punch placed on the internal mandrel and arranged on an external element respectively and adjustable relative to each other along the axis of the mandrel. Reshaping of the bottom closure normally takes place at a temperature in the TG range. However, reshaping in some embodiments of the invention also takes place above or below the TG range. The major portion of the material in the bottom part is therefore, also immediately after the actual reshaping process, chiefly amorphous or alternatively thermally crystallized.

Through reshaping of the bottom closure of the blank as described in the forgoing paragraph the stamp moves the material in the bottom closure, during the latter part of its relative movement towards the die, in a direction towards the opening part of the blank at the same time as the bottom closure is arched towards the inside of the blank. The increase in the profile length of the material in the bottom part thereby received results in the material in the bottom closure, which merges the material in the wall of the blank which is axially oriented and streteched to flow, being subjected to such high tensile forces that material flow occurs in the aforementioned transitional zone at material temperatures in the TG range or below. In this connection, in addition to the material in the wall of the blank already stretched to flow, a ring of material stretched to flow is formed which outwardly limits the otherwise chiefly amorphous material in the bottom part and forms the transition between the mainly cylindrical portion of the container and the central bottom part of the container. The forming space which arises between the stamp and the die when their movements towards each other have terminated is adapted to the desired final shape of the bottom of the container which is in the process of manufacture or is adapted to a shape suitable for the next reshaping stage. Depending on the desired properties of the material inside the ring of stretched material, the forming space is designed in order to form or process reinforcement ribs, etc. in the bottom part in accordance with the alternatives mentioned above. In certain applications the stamp and/or die have a raised temperature through which the material in the bottom part undergoes thermal crystallization simultaneously with reshaping of the bottom part.

In the next stage the mouth opening of the blank is enlarged or reduced in size, which is most simply accomplished by pressing the blank down over a conical mandrel or a sleeve. The maximum permissible increase in the circumference of the opening is adapted to the material stretching necessary in order to obtain material flow. In the case of PET the maximum permissible increase is about three times. During reshaping of the mouth the material has a temperature in excess of TG. The temperature is further chosen in regard to and normally higher than the maximum temperature the container will be exposed to in use.

In one version of the invention the remaining material in the blank is heated to the same temperature, which means that the material stretched to flow shrinks. The amorphous material in the bottom part of the blank is also subjected to shrinkage forces when heated which tend to restore the mainly amorphous material in the bottom part to the shape the material had before it was reshaped by means of the stamp and die. The ring of material stretched to flow nevertheless prevents a return to the original shape because the ring contracts and does not allow amorphous material adjacent to the ring to move back to the positions the material had before reshaping of the bottom part. Depending on the degree of thermal crystallization it is desired to achieve in the material in the bottom part, the material is retained at the temperature specified above for a shorter or longer period of time. The blank treated in this manner now forms a finished container or a preform completely lacking in a tendency to shrinkage at all temperatures below the temperature at which shaping of the mouth section and shrinking of the stretched material was achieved.

In cases where the preform is to be reshaped, which usually takes place in a blowing mould, the preform is heated to a blowing temperature higher than the TG of the material but lower than the temperature at which the mouth portion was shaped. Shape changing of the preform when the temperature of the material is adjusted to reshaping temperature is avoided in this way.

The preform is preferably preheated and obtains its final temperature adjustment to blowing temperature in the blowing mould in that the preform is heated additionally in it or, alternatively, in that it cools slightly when it is placed in the blowing mould. Temperature adjustment is carried out in accordance with a known technique, e.g. by means of an internal mandrel, circulating liquid, hot mould walls, etc. With the material in the preform at blowing temperature the interior of the preform is pressurized and the preform is expanded until it is in contact with the walls of the blowing mould while the profile length of the material is simultaneously retained. This is achieved by moving the bottom of the preform towards the opening of the preform while simultaneously moving the central bottom part of the blowing mould. In the final stage of forming the container the moved central bottom part forms in the blowing mould even transitional surfaces with adjacent surfaces at the same time as the expanded preform is in contact with all forming surfaces in the blowing mould. Through contact with the forming surfaces of the blowing mould, thermal crystallization of the material is added in one alternative version of the invention in addition to the crystallization of the material obtained through the axial and transversal stretching.

In certain applications, thermal crystallization of the material in the container is concluded in conjunction with the recently described final forming of the preform and, in certain applications, also in conjunction with the forming of the central bottom part.

In accordance with the invention it is possible to produce a container which is shape-permanent on being heated to temperature in the vicinity of the blowing temperature of the material and/or the temperature of the forming surfaces of the blowing mould. The blowing temperature and the temperature of the forming surfaces of the blowing mould are usually lower than the temperature at which the material in the mouth portion of the blank was reshaped.

BRIEF DESCRIPTION OF THE FIGURES OF THE DRAWING

The invention is described hereafter with reference to a number of figures, where FIG. 4a shows the area B in FIG. 4 in detail, FIG. 5 a-c show versions of a container formed through reshaping of the mouth portion of the preform as in FIG. 4.

DETAILED DESCRIPTION

Figures 1, 2, 3, 3A:
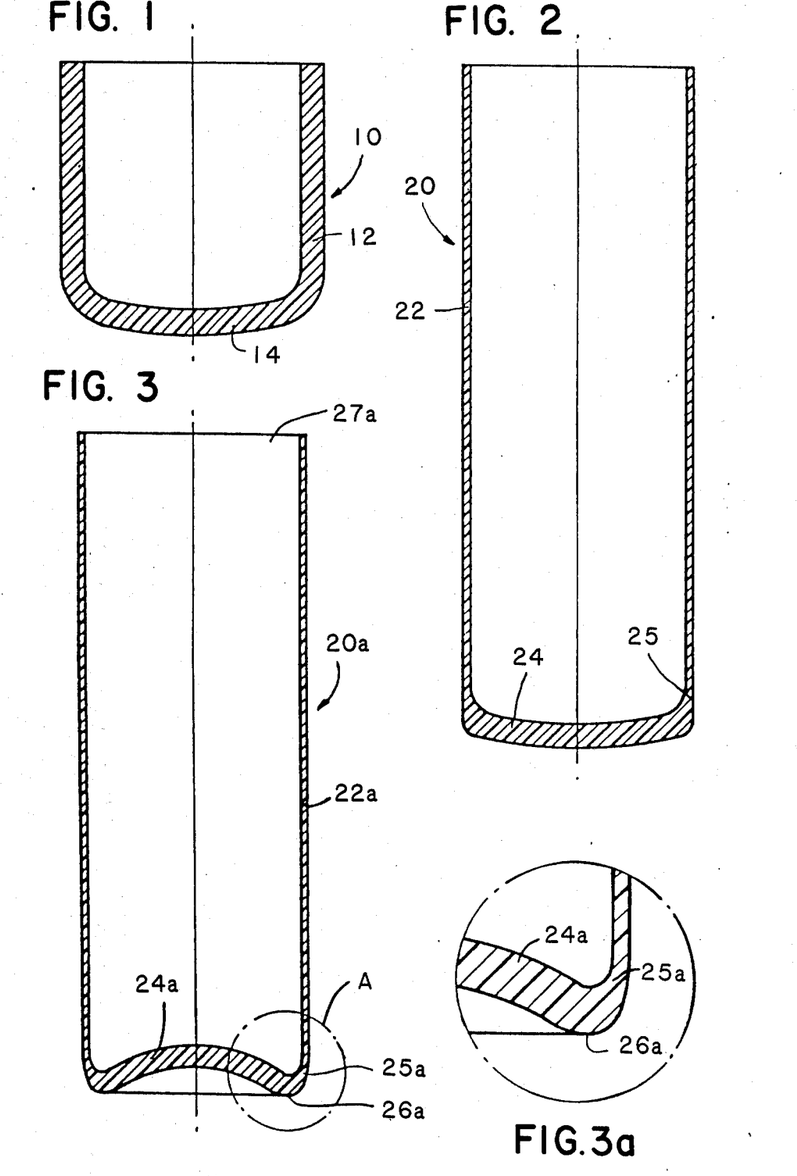
FIG. 1 is an axial cross-section through a blank consisting chiefly of amorphous material.
FIG. 2 is an axial cross-section through a preform formed from the blank as in FIG. 1.
FIG. 3 shows the preform as in FIG. 2 with reshaped bottom.
FIG. 3a shows the area A in FIG. 3 in detail.

Depicted in FIG. 1 is a tubular blank 10 of chiefly amorphous material with a cylindrical portion 12 and a closure 14 at one end.

FIG. 2 shows a preform 20 formed from the blank 10 through stretching of the material in the cylindrical portion 12 of the blank 10 to flow. The preform thus formed has a cylindrical portion 22 and a bottom part 24.

FIGS. 3 and 3a show the preform as in FIG. 2 with reshaped bottom part 24a. In certain applications the bottom part 24 is reshaped with the material at a temperature in a range lower than the thermoelastic temperature range of the material (in or below the TG range). The increase of the profile length of the bottom part 24 that reshaping entails means that the preform as in FIGS. 3 and 3a is provided in conjunction with reshaping with a ring-shaped area of material 25a stretched to flow, henceforth also designated ring-shaped transition, which is formed of amorphous material which in blank 10 is situated in the transition between the closure 14 of the blank and the cylindrical portion 12 of the blank. The corresponding area of material in the preform as in FIG. 2 has undergone a certain degree of stretching, although less than the stretching that corresponds to material flow. On reshaping of the bottom part 24 the afore-mentioned pre-stretched area of material is subjected to additional stretching with the result that material flows. Accordingly, material flows in the blank 10 and the material, which flows, is situated closer to the axis of the blank than the material which in the blank forms the cylindrical portion 12. The material of the ring-shaped transition has a smaller initial radius than the material in the cylindrical portion. Also indicated in the figures is a standing surface 26a and the mouth portion of the preform 27a.

In another version the bottom part 24 is reshaped with the material at a temperature within the thermoelastic temperature range of the material. As a result, the profile length of the bottom part increases in conjunction with reshaping as the thickness of the material in the bottom part decreases during simultaneous elongation of the material. The equivalent to the ring-shaped transition of material which is stretched to flow as described in the previous paragraph consists of a ring-shaped area of material stretched to flow which was formed during the passage of the blank through the draw ring and which is situated adjacent the bottom part 24 of the blank. FIGS. 3 and 3a are also representative of the ring-shaped area of material which is formed according to this version and which is accordingly assigned reference number 25a in the figures.

Figures 4, 6:
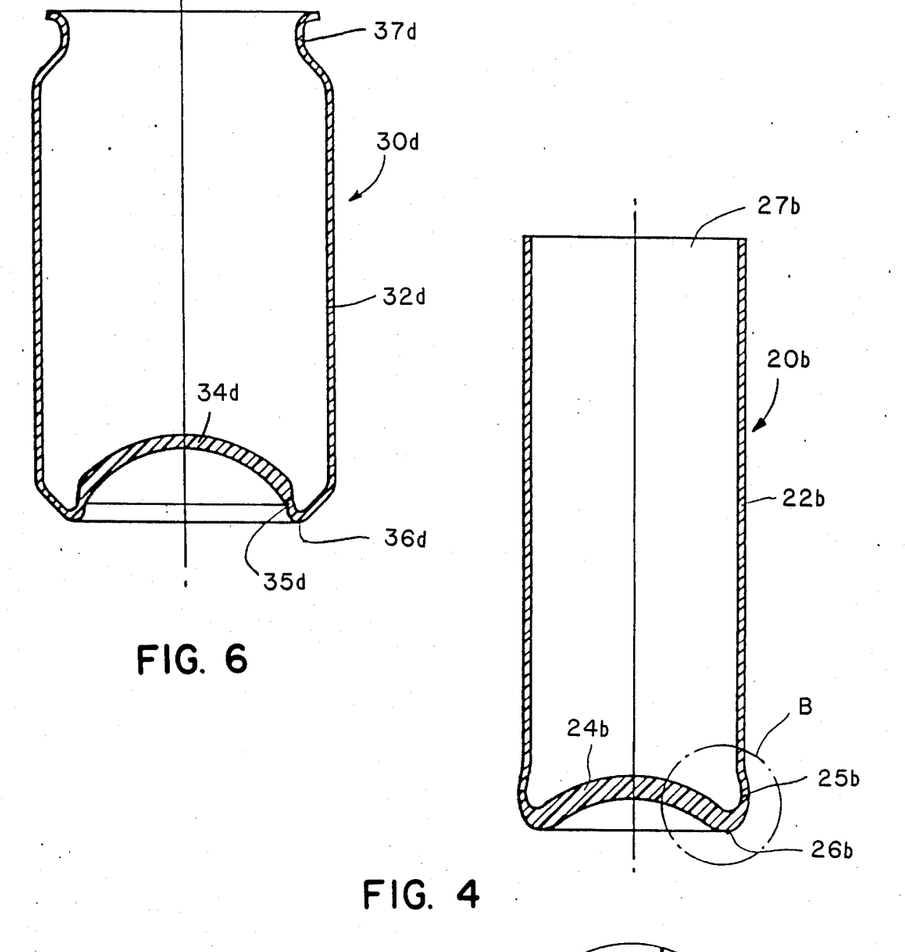
FIG. 4 shows the preform after it has been heated for relieving of the material stresses built into the material of the cylindrical part of the preform in conjunction with forming of the preform.
FIG. 6 shows a container formed through reshaping of the container as in FIG. 5b.
Figure 4A:
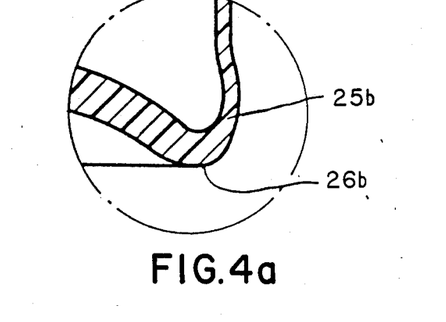

FIGS. 4a and 4a show the preform as in FIGS. 3 and 3a which has been heated to a temperature higher than the TG range of the material. In the case of PET the material has been heated to a temperature preferably higher than the TG range by at least about 40° C., i.e. has been heated to at least about 120° C. Through heating, the preform is given a smaller axial length and the cylindrical portion 22b a smaller diameter (cf. the figures). The reduction of the diameter of the ring-shaped transition 25a results in the bottom part 24b of the preform 20b being given a sharper bend than the bottom part 24a and it consequently bulges deeper into the cylindrical portion than the bottom part 24a. In the version of the invention where the ring-shaped transition 25a is formed by amorphous material closer to the axis of the blank than the material in the cylindrical walls of the blank, the contracting effect in the ring-shaped transition 25a is intensified, which as a rule results in greater inward bulging of the bottom part 24b into the cylindrical portion 22b.

Figure 5A:
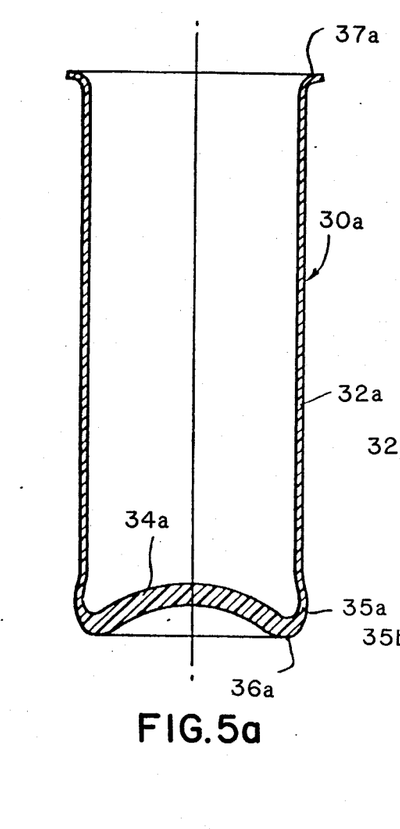
Figures 5B, 5C:
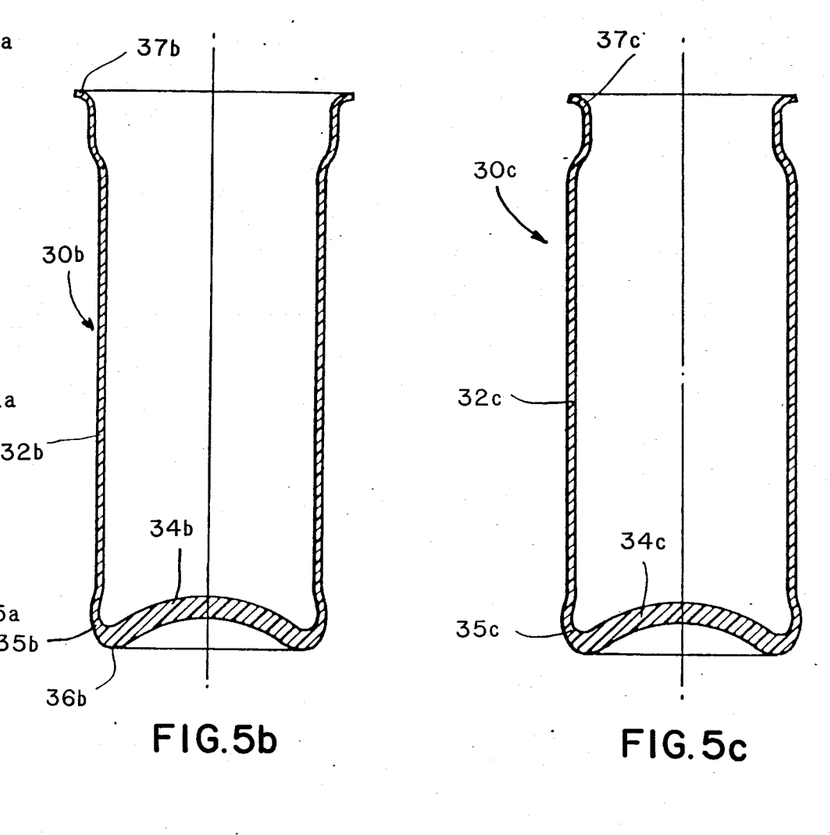

FIGS. 5 a-c show alternative versions of an initial version of containers 30a, 30b and 30c according to the invention which are formed by preform 20b being reshaped in its mouth portion 27b. In FIG. 5a the container 30a has a flared mouth portion 37a, in FIG. 5b the container 30b has a mainly conical flared mouth portion 37b, and in FIG. 5c a constricted mouth portion 37c. The mouth portions are adapted for folding together with a sealing end-section which, however, is not shown in any of the figures. Indicated in these with reference designations 34a-34c are a central bottom part, with 35a-35c the ring-shaped transitions and with 36a-36c the ring-shaped standing surfaces.

In the alternative version of a container 30d shown in FIG. 6 the contour length of the material stretched to flow in the mouth portion 37d of the container, the cylindrical portion 32d of the container, and in the ring-shaped transitional zone 35d coincides with the corresponding contour length of the mouth portion 27b, the cylindrical section 22b and the ring-shaped transitional zone 35b. The central bottom part 34d of the container is not as thick as the central bottom part 24b of the preform 20b. In a preferred version, the central bottom part is also thinner in the parts closest to the axis of the container. Between the central bottom part 34d and the ring-shaped standing surface 36d of the container is the ring-shaped area 35d of material stretched to flow which stabilizes the shape of the bottom part 34d and prevents the bottom part from turning inside out when the pressure in the container rises and/or when the container is heated. The ring-shaped area of material 35d corresponds in preform 20a to the ring-shaped area of material 25a. From the figure it is also evident that the material in the cylindrical portion 32d and the mouth portion 37d of the container is stretched in the circumferential direction of the container in addition to its stretching along the axis of the container. This (circumferential) stretching amounts at maximum to a stretching which gives rise to material flow.

Figure 7:
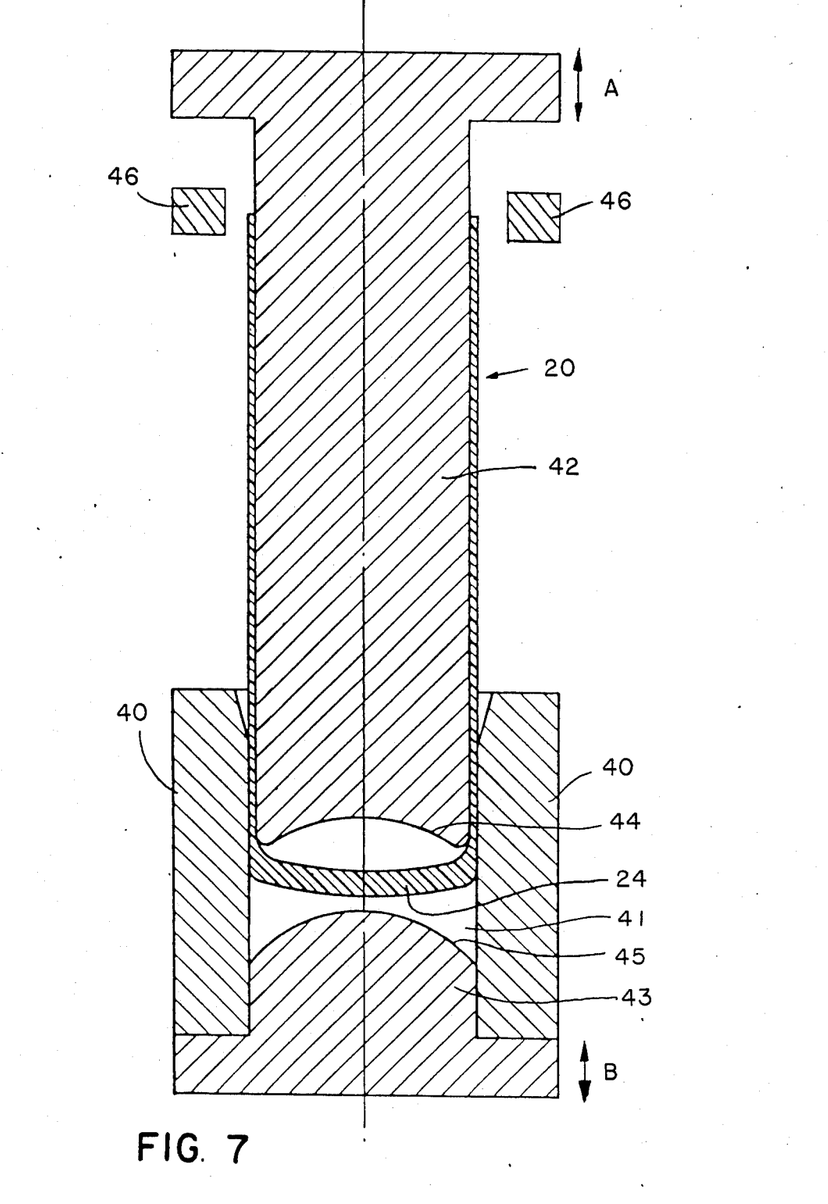
FIG. 7 shows a device for reshaping the bottom part of the preform; and, FIGS. 8-10 show a device for reshaping a preform into a container as in FIG. 6 in various stages of the reshaping process.

FIG. 7 shows a device for reshaping a preform 20 as in FIG. 2 into a preform 20a as in FIG. 3. Depicted in the figure is a locating body 40 with a cylindrical cavity 41, the diameter of which corresponds to the outside diameter of the preform 20. A mandrel with a diameter adapted to the inside diameter of preform 20 is an initial forming element 42 which is movable along the axis of the cavity and relative to a second forming element 43. The first forming element is situated inside preform 20 and the second forming element is situated on the other side of the bottom part 24 of the preform. The first forming element 42 presents a concave forming surface 44 to the bottom part 24 and the second forming element presents a convex forming surface 45 to the bottom part. For the sake of simplicity, the drive elements for the movement of the forming elements are omitted in the figure but drive elements can be arranged in accordance with any already known technique. Further, the movement of the forming elements towards each other is controlled in such a manner that in the final forming position the distance between the forming surfaces of the forming elements corresponds to the thickness of the reshaped bottom part 24a. Depicted in the figure are stops 46 which regulate the maximum movement of the first forming element 42 in a direction towards the locating body 40.

Arrows A and B indicate the directions of movement of the first and second forming elements respectively.

Figure 8:
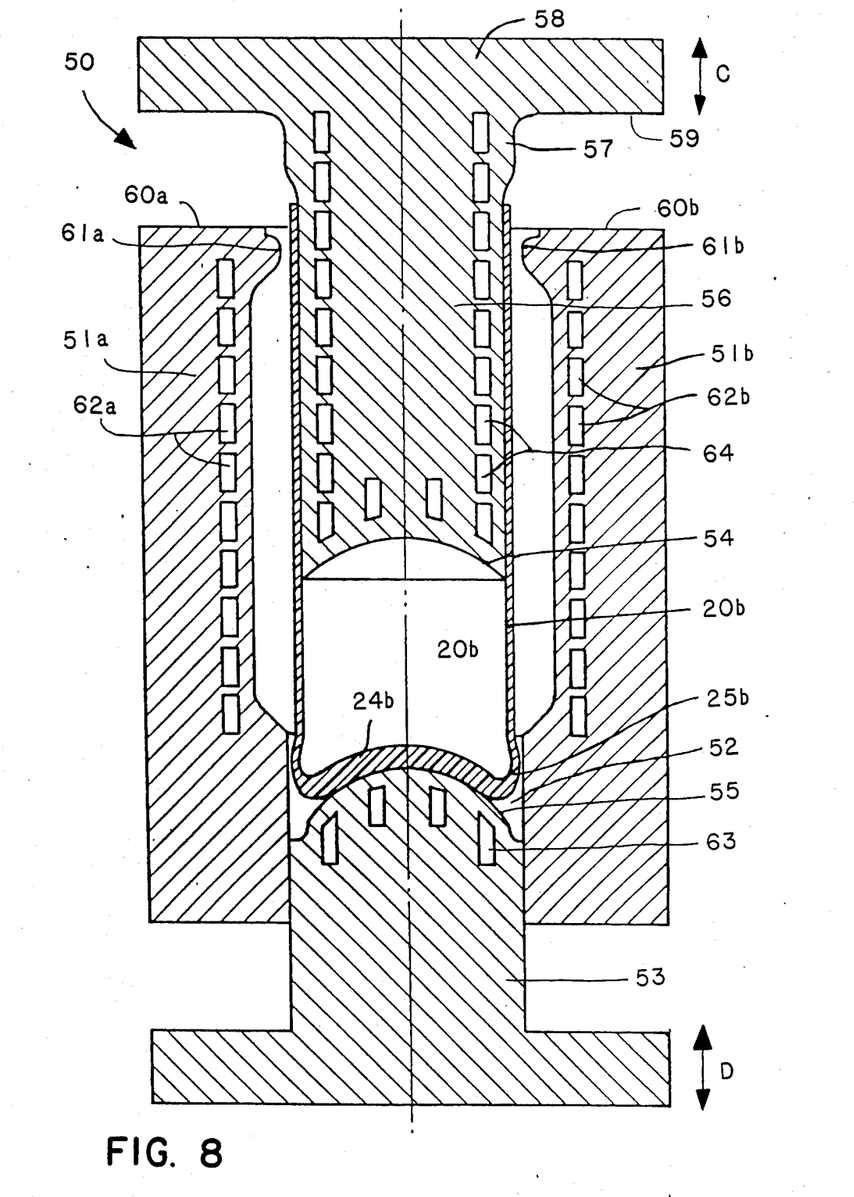
Figure 9:
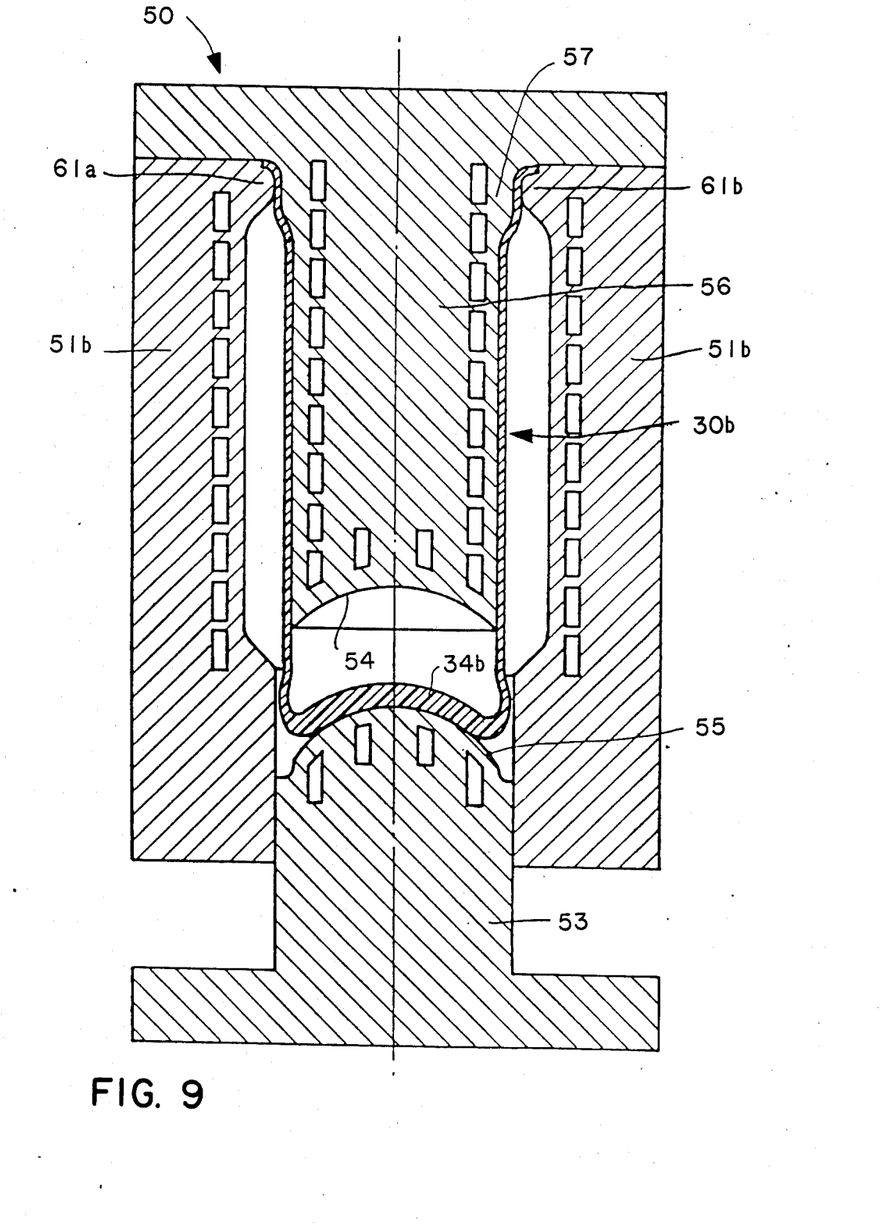
Figure 10:
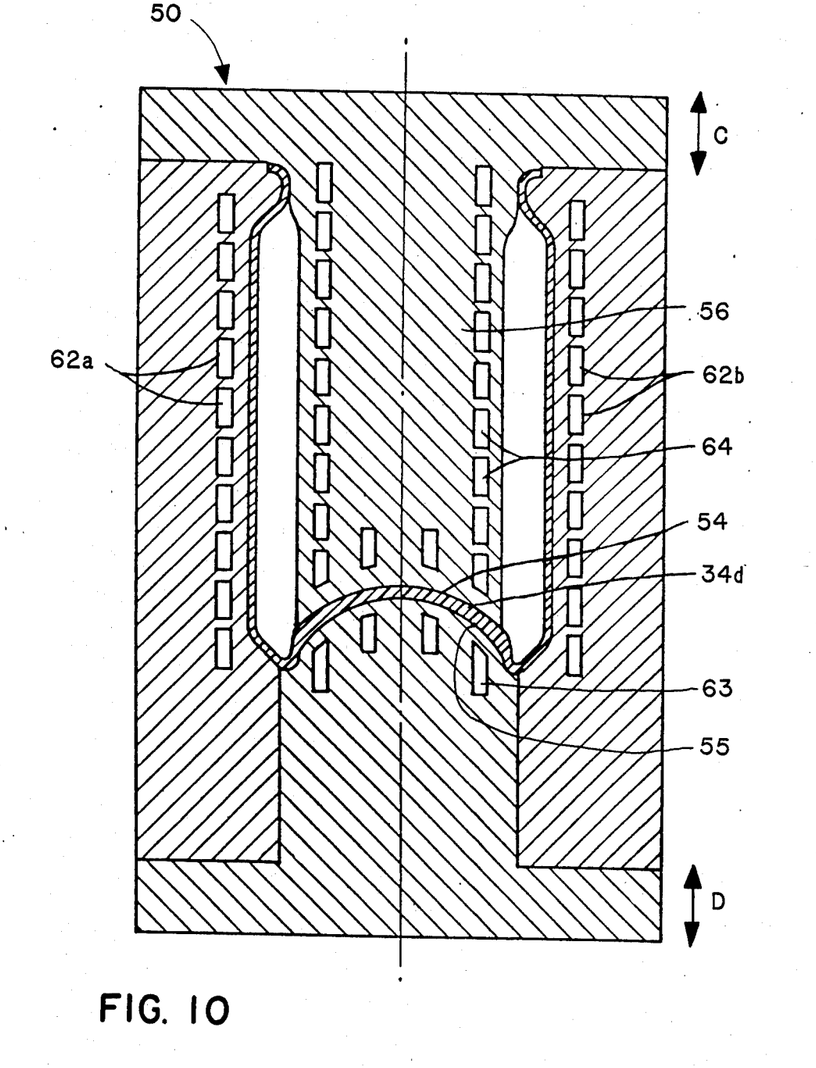

FIGS. 8–10 show a device for final forming of a preform as in FIG. 3 or FIG. 4. Even though a preform 20b shrunk through heating is shown in FIG. 8, it is just as easy to use the device for reshaping of a preform 20a.

The figures show a blowing mould 50 with two mould halves 51a, b. At the lower part of the blowing mould is a cylindrical cavity 52 bounded by the two mould halves 51a, b with a diameter adapted to the diameter of preform 20b in order to permit the preform to pass into the cavity. In the cavity the blowing mould is arranged with a bottom part 53 which is movable in the cavity and in the direction of the arrow D to assume the position shown in FIG. 10 at one of its end positions. The bottom part 53 corresponds to the previously-mentioned second forming element 43 and like it is arranged with a convex forming surface 55.

Bottom part 53 is relieved about its periphery to form a narrow radially extending annular surface and a slight annular recess between said convex surface and said radially extending annular surface. A mainly cylindrical mandrel 56 with a diameter mainly coinciding with the inside diameter of preform 20b and adapted to permit the mandrel to pass into the preform corresponds to the previously-mentioned first forming element 42 and like it is arranged with a concave forming surface 54. At its upper part the mandrel is arranged with a part 57 of larger diameter and terminates in a flat-like part 58 with a lower contact surface 59 adapted to abut against an upper contact surface 60a,b on the mould halves 51a, b. The mandrel 56 is capable of moving back and forth in the direction of arrow C to assume the position shown in FIGS. 9 and 10 at one of its end positions. The blowing mould halves 51a,b have at their upper parts 61a,b a shape adapted to the shape of the mandrel in part 57 of larger diameter whereby, with the mandrel 56 in the end position shown in FIGS. 9 and 10, a forming space adapted to the shape of the mouth portion of the future container is formed between the mandrel and the upper parts of the blowing mould halves. Further, with the mandrel and bottom part 53 in the positions shown in FIG. 10, a corresponding forming space for the central bottom part 34c of the future container is formed. Liquid passages 62a,b, 63 and 64 are arranged in the mould halves 51a,b, in the bottom part 53 of the blowing mould, and in the mandrel 56 for heating or cooling of the respective elements.

In order to simplify the figures, the passages for the pressure medium, as well as all drive elements for the movements of the mould halves 51, the bottom part 53 and the mandrel 56, are omitted.

In the introductory part of the description an explanation was given as to how a preform is obtained. Reshaping of preform 20 into the versions 20a and 20b is begun in a device as shown in FIG. 7. The preform 20 is placed over the mandrel 42 and with the aid of it is introduced into cavity 41 until the bottom part 24 of the preform abuts against the convex surface 45 of the second forming element 43. The mandrel then continues its movement towards the second forming element until a forming space corresponding to the shape of the desired bottom part 24a of the preform 20a is formed between the convex surface 45 of the forming element 43 and the concave surface 44 of the mandrel.

In an initial example the material then has at least in the lower part of the preform 20 temperature in the TG range or below, whereby the formation of the ring-shaped transition 25a is concluded in accordance with the forming stages described in the foregoing paragraph.

In a second application example the material in the lower part of the preform 20 has a temperature higher than the TG range, whereby the material has rubber-like properties and reshaping takes place during successive stretching of the material in the bottom part 24. Depending on which of the versions of the central bottom part is desired in the container which is being manufactured, the material in the bottom part is heated or cooled on coming into contact with the concave and convex surfaces 44, 45.

A comparison of FIGS. 7 and 8 will clearly show that reshaping of preform 20 into the preform 20a can also take place in a device as shown in FIG. 8, whereby preform 20a is formed during the initial stage of forming the container 30d.

When using a device as shown in FIGS. 8-10 the mouth portion of the future container is also formed during the initial stage of reshaping the preform through part 57 of the mandrel 56 having a larger diameter moving the material radially outwards towards the upper parts 61a,b of the mould halves. The preform is then as a rule able to withstand the axial forces without undergoing deformation. In cases where the processing temperature and the material have been so chosen that the axial strength of the preform is insufficient, forming of the mouth portion of the future container can be carried out more suitably in a separate device having a cylindrical cavity for supporting the preform more or less along its entire length.

Through heating of the material in preform 20a it is transformed, as has already been described, into the preform 20b. Heating of the preform 20a takes place in accordance with an alternative version of the invention in separate heating ovens while in another version heating takes place in the blowing mould 50. Versions also naturally exist in which heating in ovens is combined with adjusting the temperature in the blowing mould. Temperatures of interest in connection with the various forming stages have been dealt with in the introductory part of the description.

Regardless of whether a heated preform 20a or a heat-treated preform 20b has been inserted into blowing mould 50 after the mandrel 56 has been moved to its lower position, the preform is transformed into the shape shown in FIG. 9. In certain applications this corresponds to the desired end product while in other applications the mandrel has a larger axial length in order to permit certain reshaping and heat treatment of the material in bottom part 34b.

In the event that a container 30d is to be produced, the interior of the container 30b, which is now to be regarded as an intermediate product, is pressurized and as a result the walls of the intermediate product are blown out or expanded to make contact with the forming surfaces of the mould halves 51a,b at the same time as the bottom part 53 of the blowing mould is moved upwards and so permits reshaping to take place with retention of the profile length of the section of material of the intermediate product consisting of material stretched to flow. In its upper position (FIG. 10) the concave forming surface 54 and the convex forming surface 55 interact for the formation of a forming space adapted to the shape of the central bottom part 34d of the desired container.

The liquid passages 62a,b, 63 and 64 then carry hot or cold liquid, depending on which of the versions mentioned in the introductory part of the description is aimed at in the individual application example. Through simultaneous retention of the internal pressure in the formed container and supplying heat to the forming surfaces, a container is producted where thermal crystallization is also obtained in the parts of the material which are crystallized through stretching of the material.

In the above description it has been stated that the blank and the preform respectively have a cylindrical portion. Naturally, the cross-section of both the blank and the preform as well as that of the formed container, does not need to be circular since in accordance with the invention other shapes are also suitable.

The description and the figures have mainly described the application of the invention to a preform whose cylindrical portion consists of material that has been stretched to flow. From the description it is also plainly evident that the invention is applicable for the production of a container from a preform where only an area of material adjacent to the bottom closure of the preform consists of material that has been stretched to flow.

The invention is applicable in connection with the production of containers from both injection-moulded and extruded blanks.

What is claimed is:

1. A method of producing a container comprising providing a preform having a bottom closure of relatively thick material which is joined by an annular ring-shaped region to a tubular portion having a mouth remote from the bottom closure, said tubular portion defining an axis for the preform and consisting of material joined to said annular ring-shaped region oriented along the axis of the preform with an orientation corresponding to that produced in a sheet of material stretched monoaxially to cause material flow, forming the bottom closure inwardly into the preform towards said mouth while said ring-shaped region is stretched and axially stressed so that said ring-shaped region becomes axially oriented and of substantially the same thickness as the material of said tubular portion which is joined thereto such that said ring-shaped region tends to contract for preventing said bottom closure from straightening out or turning inside-out, and expanding the tubular portion of the preform after the stretching and stressing of the ring-shaped region to form the container, the forming of said bottom closure inwardly into the preform forming a standing surface for the container in the vicinity of said ring-shaped region whereat the relatively thick bottom closure is connected to the oriented material of said tubular portion via said ring-shaped region whereby to achieve uniformity of thickness and orientation between the material of the ring-shaped region and the material of the tubular portion joined thereto, and connection of the relatively thick bottom closure to said ring-shaped region, in the vicinity of the standing surface.

2. A method as claimed in claim 1 wherein the material in said bottom closure in amorphiciand said forming thereof is at a temperature within or below the range of the glass transition temperature of the material, whereby the amorphous material in said bottom closure is stretched to flow at least in the region adjacent the oriented material in said ring-shaped region.

3. A method as claimed in claim 1 comprising reducing the thickness of the material in said bottom closure during said forming thereof.

4. A method as claimed in claim 1 after formation of the container comprising heating the material of the ring shaped region after formation of the container to a temperature within the thermal crystallization range.

5. A method as claimed in claim 1 comprising heating the material of the ring shaped region after formation of the container to a temperature above the temperature at which thermal crystallization of the material is a maximum.

6. A method as claimed in claim 1 comprising expanding said mouth of the preform 7. A method as claimed in claim 1 further comprising heating the material in said ring-shaped region to a temperature above the region of the glass transistion temperature range of the material before expanding the material in said tubular/portion 8. A method as claimed in claim 7 comprising expanding the mouth of the preform before expanding the tubular portion.

9. A method of producing a container as claimed in claim 1 comprising deforming the material in said ring-shaped region to produce the orientation in said region.

10. A method of producing a container as claimed in claim 9 wherein the deforming of said ring-shaped region forms said standing surface between said bottom closure and the expanded material of said tubular portion.

11. A method of producing a container as claimed in claim 1 wherein said expanding of said tubular portion of said preform produces circumferential stretching of the material of said tubular section which is superimposed on the monoaxially stretched material thereof.

12. A method of producing a container as claimed in claim 1 wherein the bottom closure of the preform is relatively flat and is reshaped to curve inwardly after the material of said tubular portion has been axially oriented.

* * * * *